Dec. 22, 1970 R. K. HELDMAN ET AL 3,550,083
DATA COMMUNICATION VIA DIRECT-COUPLED INDIVIDUAL PARALLEL CONDUCTORS
Filed June 2, 1969 8 Sheets-Sheet 1

INVENTOR.
ROBERT K. HELDMAN
ALEX W. KOBYLAR
BY Bernard E. Franz
ATTY.

Dec. 22, 1970 R. K. HELDMAN ET AL 3,550,083

DATA COMMUNICATION VIA DIRECT-COUPLED INDIVIDUAL PARALLEL CONDUCTORS

Filed June 2, 1969 8 Sheets-Sheet 4

Dec. 22, 1970 R. K. HELDMAN ET AL 3,550,083

DATA COMMUNICATION VIA DIRECT-COUPLED INDIVIDUAL PARALLEL CONDUCTORS

Filed June 2, 1969 8 Sheets-Sheet 5

Dec. 22, 1970 R. K. HELDMAN ET AL 3,550,083

DATA COMMUNICATION VIA DIRECT-COUPLED INDIVIDUAL PARALLEL CONDUCTORS

Filed June 2, 1969 8 Sheets-Sheet 8

United States Patent Office 3,550,083

Patented Dec. 22, 1970

3,550,083

DATA COMMUNICATION VIA DIRECT-COUPLED INDIVIDUAL PARALLEL CONDUCTORS

Robert K. Heldman, Naperville, and Alex W. Kobylar, Chicago, Ill., assignors to Automatic Electric Laboratories, Inc., Northlake, Ill., a corporation of Delaware Filed June 2, 1969, Ser. No. 829,525

Int. Cl. H04m *3/22*; H04j *3/00*

U.S. Cl. 340—146.1 14 Claims

ABSTRACT OF THE DISCLOSURE

Data in the form of direct-current signals is transferred from the flip-flop data register of one subsystem to the corresponding flip-flop data register of another subsystem. The flip-flops are of the type having input coincidence gates with a direct-coupled input with a priming delay for the data signal and a capacitance-coupled input for a clock signal. "Window" intervals are used to provide a delay between placing the data on the line at the sending subsystem and supplying clock pulses for loading it into the data register at the receiving subsystem. The data register outputs at the receiving end are connected via other conductors of the data bus to the comparison check circuit at the sending end where the signals are compared to the data which was sent. The clock pulse for loading the receive register is controlled by an accept signal from the send subsystem to provide the desired delay. In case there is an error in the data transmission as indicated by failure to find a valid comparison, then the sending subsystem maintains the accept signal on the control conductor to the receive subsystem, where its presence outside of the window interval causes the data register to be reset, and on the next occurrence of the window interval there is a repeated attempt to load the data. There are also redundant subsystem units at each end of the data bus. The specific system disclosed is a communication switching system in which one subsystem is a marker provided in duplicate and the other subsystem is a common unit provided in triplicate.

BACKGROUND OF THE INVENTION

Field of the invention

This invention relates to a data communication arrangement, and more particularly to the direct-current transfer of data via parallel conductors between two subsystems within a digital control system such as a communication switching center.

Description of the prior art

Among the many known arrangements for the transfer of data between two subsystems, one of the simplest and fastest is the simultaneous transfer of an entire block of data using direct-current signals via parallel conductors.

Each of the subsystems performs a plurality of logical control or data processing operations which must be performed in some orderly manner. One type of arrangement for insuring a proper sequence of operations is to provide several flip-flops for storing the data and control information used in the logical operations between steps. The output circuits from the flip-flops and other information sources are supplied to a set of logic gates, and the outputs from these gates are in turn supplied to the inputs of the flip-flops or to output terminals. The flip-flops are constrained to change state only at definite times by supplying a train of clock pulses occurring at fixed regular intervals, and gating these clock pulses to the flip-flops which are to change state at any particular point in the sequence of operation. To insure that flip-flops do not supply input signals to the same or other flip-flops while they are changing state, the inputs of the flip-flops are provided with a gating arrangement which requires a definite priming time for the D.C. inputs. Therefore, at the inputs of the flip-flops there are provided coincidence gates, each of which has a direct-coupled input and a capacitance-coupled input, with circuit constants chosen so that the direct-current signals via the direct-coupled input must be present for the required priming time before the clock pulse is applied at the capacitance-coupled input to set the flip-flop to the particular state corresponding to that input. One or more such coincidence gates may be provided for setting each flip-flop to each of its two states. Each of the subsystems will normally be supplied with its own train of clock pulses, and will have its own sequence control circuits, and the clock pulse repetition rate may be different for the respective subsystems. There may be a master clock for controlling the clock pulse generators of all of the subsystems, or the subsystems may be asynchronous, each having its own master clock.

For the transfer of data between the two subsystems, each system may be provided with a data register comprising a plurality of the flip-flops, with the outputs of the data register flip-flops of the subsystem which is in a sending mode connected via the parallel conductors of a data bus to the direct-coupled inputs of coincidence gates of the data register of the subsystem which is in a receiving mode. The data is then effectively transferred when the receiving subsystem supplies a clock pulse to the capacitance-coupled inputs of the corresponding coincidence gates.

For reliable operation, redundancy may be provided by duplicating or even triplicating each of the complete subsystems. It is desirable that all of the redundant subsystems have the same information, and comparison checks are made to insure that this is so.

One problem with data transfer arrangements of the type described is that the different flip-flops of the receiving subsystem may have slightly different priming times, and therefore some of them may directly receive the data while the others do not. This problem becomes particularly acute if the redundant subsystems are considered.

Another problem is that the sending subsystem must not assume that the data has been correctly transmitted and proceed to other steps of operation until a comparison check has been made and it is assured that the redundant receiving subsystems have all received the data correctly.

Another problem is that noise bursts, etc. on the data bus may cause errors, and therefore a single attempt at transmission of a single block of data may not be adequate.

SUMMARY OF THE INVENTION

The invention is incorporated into a system in which one of the subsystems has a recurring operation cycle which is divided into a given number of timing intervals separated by its clock pulses; this subsystem being referred to hereinafter as the first unit, while the other subsystem is hereinafter referred to as the second unit. According to the invention the first unit is provided with an arrangement for producing a "first window" and a "second window" interval occurring during each operation cycle. For example in the specific embodiment disclosed herein the operation cycle is divided into sixteen intervals designated 0 and 1–15 inclusive, with the "first window" signal occurring during the intervals 8, 9, 10 and 11; and the "second window" interval occurring during the intervals 2, 3, 4 and 5. Note that there cannot be any overlap of the two windows. The "first window" is for use in controlling the sequence of operations in the first unit, and the "second window" is for controlling the sequence of operations in the second unit. When data is to be transferred, one of the units will be in a send mode and the other in a receive mode. To solve the problem of providing adequate priming time to insure the correct transfer of data, the unit in the send mode loads the data into its data register and applies the outputs to the conductors of the data bus, and during its window applies an "accept signal" via one of the conductors of the data bus to the other unit; and the unit in the receive mode upon receiving the accept signal, waits until its own window interval occurs, and then gates clock pulses to the capacitance-coupled inputs of its data register to load the data from the data bus. Thus the time between sending the "accept" signal and the setting of the flip-flops in the receiving unit is insured of being not less than the sum of the priming time for the receiving flip-flops plus the propagation time via the data bus.

Further according to the invention, the unit in the sending mode is provided with a comparison check circuit. The outputs of the flip-flops of the data register of the unit in the receive mode are connected via additional parallel conductors of the data bus to the comparison check circuit as one set of inputs thereof, and the outputs of the unit in the send mode are connected to the comparison check circuit via another set of inputs. When there is complete correspondence between the data signals on the two sets of inputs of the comparison check circuit, a comparison check signal is generated which is used to effect termination by the unit in the send mode of its accept signal. However, if the valid comparison is not found, the accept signal is continued. The unit in the receive mode, at the end of its window interval upon finding the accept signal still present, supplies clock pulses to reset the flip-flops of its data register, and upon the next occurrence of its window interval supplies clock pulses to again load the data from the data bus. If because of a noise burst or any other cause, there is a failure to receive the data correctly, a repeated attempt occurs during the next operation cycle.

A comparison may also be made of the corresponding signals of the redundant units in the reecive mode, and appropriate action taken if there is not a valid comparison of all of the corresponding signals from the data registers.

In a specific embodiment of the invention, incorporated in a telephone switching center, the first unit is the central processor or common control unit, and the second unit is the marker. Furthermore in this specific embodiment the common units are triplicated, and the marker units are duplicated. The common system includes a set of comparison apparatus which monitors certain check points including the outputs of the data registers and takes appropriate action if there is a difference among corresponding signals.

CROSS-REFERENCES TO RELATED APPLICATIONS

This invention may be incorporated in the Communication Switching System described in U.S. Pat. 3,328,534 by R. J. Murphy et al., hereinafter referred to as the System patent. The switching network and marker for this system are described in a U.S. Pat. 3,413,421 by A. S. Cochran et al. for Apparatus to Select and Identify One of a Possible Plurality of Terminals Calling for Service in a Communication Switching System, hereinafter referred to as the Identifier patent.

Three co-pending U.S. applications for a Digital Control and Memory Arrangement, Ser. No. 667,170 by H. L. Wirsing and W. C. Miller, filed Sept. 12, 1967; Ser. No. 690,356 by G. P. Minarcik, filed Dec. 13, 1967 and Ser. No. 690,348 by D. K. K. Lee, J. R. Vande Wege and W. R. Wedmore, filed Dec. 13, 1967, hereinafter referred to as the Memory Sharing patent applications, disclose an arrangement of the common control equipment into three subsystems sharing a common memory. The entire common control equipment including the three subsystems is triplicated, and the outputs thereof are compared by an arrangement described in U.S. patent application Ser. No. 778,507, filed Nov. 25, 1968 by A. S. Cochran, G. P. Minarcik and H. L. Wirsing for a Central Processor Configuration Control System, hereinafter referred to as the Configuration Control patent application.

The comparison circuits are a type described in U.S. patent application Ser. No. 545,387, filed Apr. 26, 1966 and now Pat. No. 3,478,314, issued Nov. 11, 1969 by W. R. Wedmore for a Transistorized Exclusive-OR Comparator, hereinafter referred to as the Comparator patent application.

The type of logic conventions, and a description of the building block circuits including the flip-flops, is described in U.S. Pat. 3,293,368 by W. R. Wedmore for a Marker for a Communication Switching Network, and in particular a schematic drawing is shown in FIG. 51, described in columns 23, 24, 48 and 49; referred to hereinafter as said Building Block Description. Note that the marker unit described in that patent is used in an earlier switching system.

DESCRIPTION OF THE PREFERRED EMBODIMENT

Figure 2:
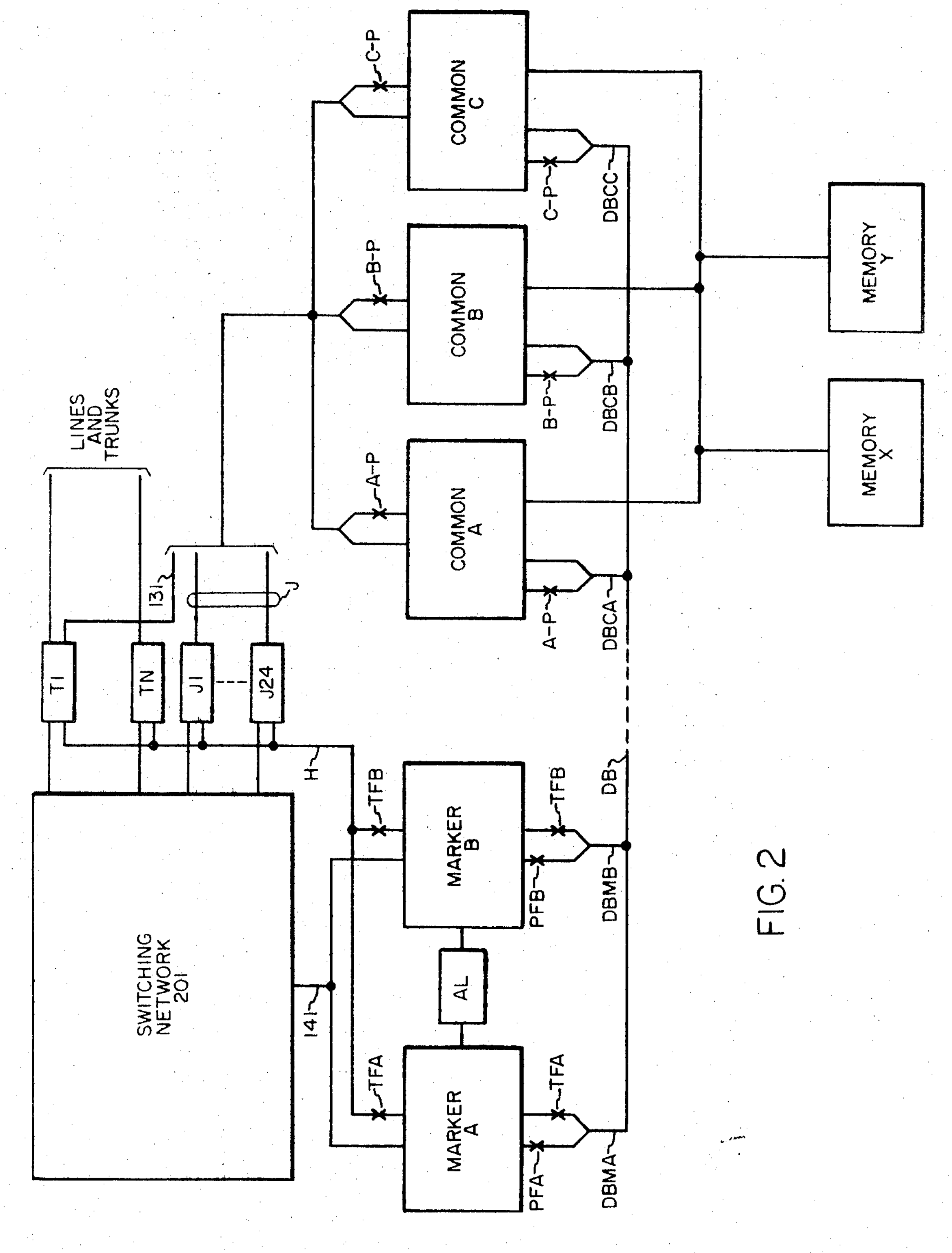
FIG. 2 is a block diagram of a communication switching center showing redundant marker units and common units interconnected by a common data bus.

The invention is related to communication of data between markers and common units via a data bus comprising a set of conductors DB. FIG. 2 shows the incorporation of these units into a communication switching center. For redundancy there are duplicate markers A and B, and triplicated common units A, B and C. There is also a duplicated memory system comprising memory X and memory Y. The switching center comprises a switching network 201 for connecting any one of a plurality of line or trunk circuits T1–TN to one another or to any one of twenty-four register-sender junctors J1–J24, as described in said system patent.

The markers are alternately on line under the control of an allotter AL which every two minutes changes from one marker to the other. The switching from one marker to the other is accomplished by some electronic gates within the markers, and by a relay transfer circuit, whose contacts are represented by X's across the lines on the drawing. The marker A when on line is connected via contacts of a plurality of relays represented as TFA, and marker B has a corresponding set of relays represented by the contacts TFB. Certain input conductors are always connected whether their marker is "on line" or "off line" represented by the contacts PFA for marker A and contacts PFB for marker B. These latter relay contacts may be opened under certain circumstances such as power failure. The data bus DB is connected to the two markers A and B via the branches DBMA and DBMB respectively. A set of conductors H for control of the line, trunk and junctor circuits is connected to all of them and via the transfer relay contacts to the two markers. The markers are connected to control conductors in the switching network via the set of conductors 141.

The central processor configuration comprises the three common units A, B and C and the two memories X and Y and associated transfer and comparison apparatus, as described in said Configuration Control patent application. The transfer circuits include relays for interconnecting the common units and the memories in a normal configuration and alternate configurations, and relays for connecting one of the common units on line to the peripheral circuits. FIG. 2 shows only a representation of the relay contacts to the peripheral units, these contacts being shown as A–P, B–P, and C–P for the three common units respectively. Normally the relay contacts A–P are closed to connect the common unit A to the peripheral units via the data bus DB, to the register sender junctors via the conductors J, and to the line of trunk circuits via the conductors 131. Only the outputs to the peripheral units are switched via the transfer contacts, the inputs from the peripheral units being supplied to all three common units in parallel. Designated signal points in the common units are compared at designated intervals during each operation cycle, and appropriate action taken by the configuration control apparatus when the three common units or the two memories do not agree.

It should be noted in particular that the data bus DB is connected by the branches DBCA, DBCB and DBCC to the three common units respectively; that the inputs are connected to all three common units in parallel, with outputs supplied only from the common unit which is on line.

Figure 1:
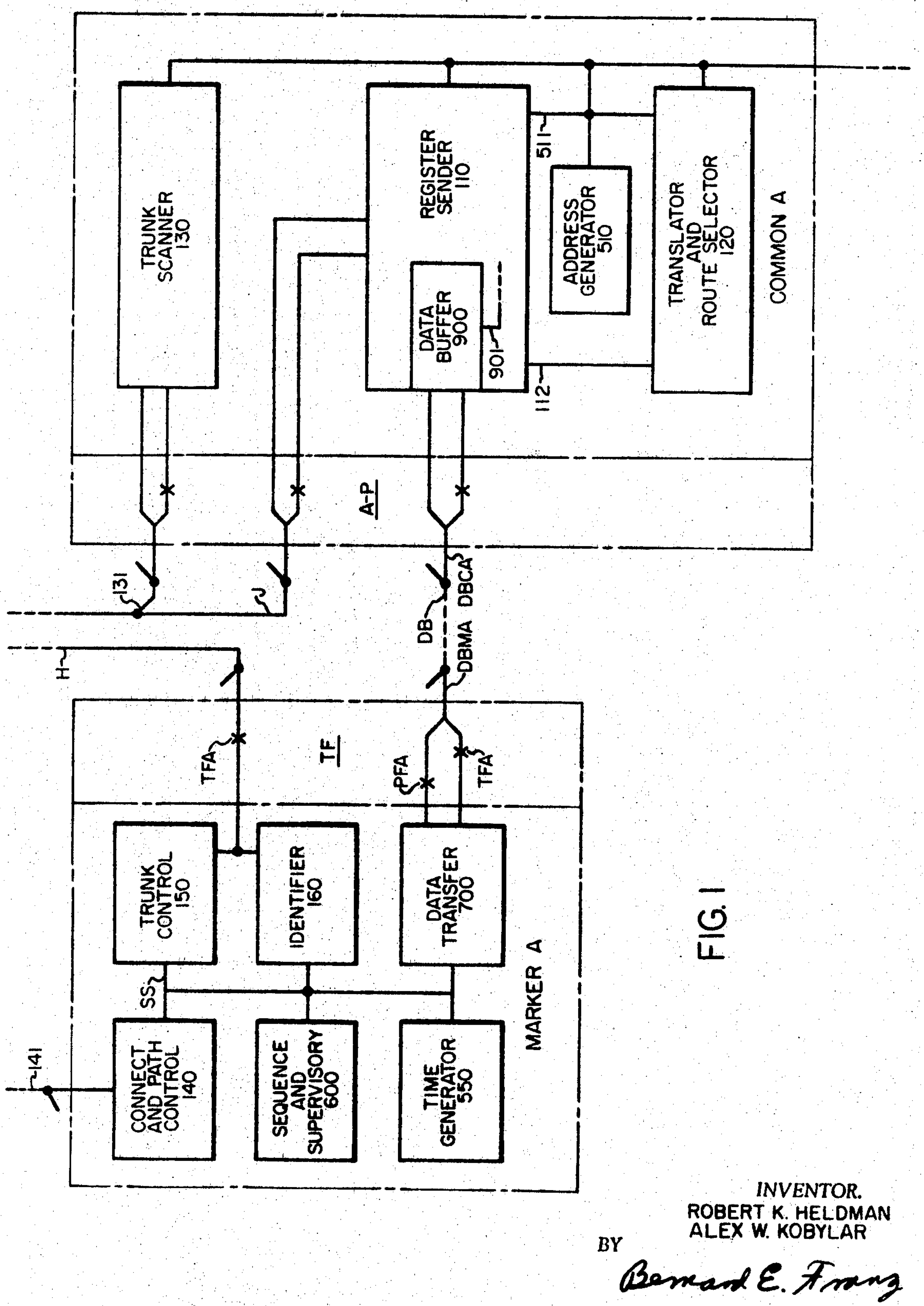
FIG. 1 is a single line block diagram of a marker unit and a common unit interconnected by a multiconductor data bus.

The principal circuits of the marker A are shown in FIG. 1. The path control circuits 140 are connected to the switching network via the set of conductors 141 to make busy-idle tests of the links of the switching network, and to supply operate potentials to set up a selected path. The trunk control circuits 150 supply control signals to the line and trunk circuits and receive signals therefrom via the set of conductors H. The identifier circuits 160 receive signals from a calling line or trunk circuit via the set of conductors H and identify the terminal number thereof, and also supply signals to operate a connect relay in a selected trunk circuit to connect it to the set of conductors H. The sequence and supervisory circuits 600 provide the sequence state signals for the entire marker, as well as other supervisory signals. The time generator 550 supplies the clock pulses, timing signals and other synchronizing signals for the marker. The data transfer circuit 700 provides for the communication of data such as line and trunk terminal numbers to the common units. The circuits are more fully described in said Identifier patent. The marker unit B has identical circuits.

The common unit A comprises three principal subsystems, a register-sender 110, a translator-and-route-selector 120, and a trunk scanner 130. Each of the subsystems operates on a time-division multiplex basis in conjunction with the memories. The register-sender subsystem operates in conjunction with the twenty-four register-sender junctors J1–J24 shown in FIG. 1, each of which has an individual section in the memory. The translator-and-route-selector subsystem provides the number translations, etc., and selects the line or trunk circuit for terminating a call. The trunk scanner subsystem scans the line and trunk circuits and up-dates the memory to indicate which ones are idle. The register-sender subsystem includes a data buffer 900 for communication with the markers.

An address generator 510 supplies the clock pulses and other synchronizing signals, as well as memory access signals, for all of the subsystems of the common unit. The common unit and the address generator are described in said Memory Sharing patent applications. The circuits in the common unit B and common unit C are identical to those in common unit A.

System operation

Figure 3:
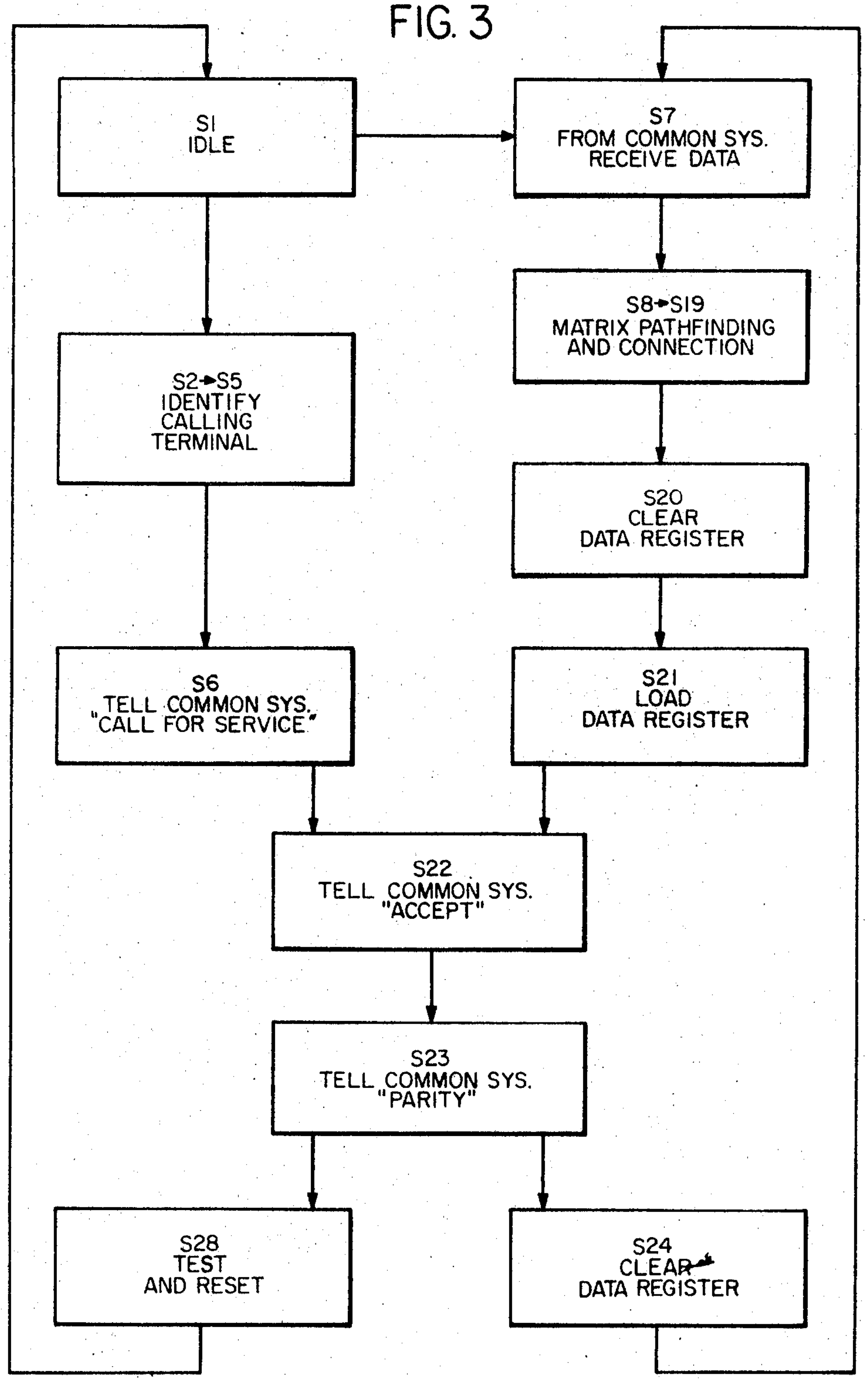
FIG. 3 is a simplified flow chart of the sequence of operations for the marker unit.

The operation of the entire system may be briefly reviewed by reference to the simplified flow chart for the marker shown in FIG. 3, in conjunction with FIGS. 1 and 2. The marker is normally in the idle sequence state S1.

Assume that an originating or incoming call is received at the line or trunk circuit T1. This supplies a signal via the set of conductors H to the identifier circuit 160, which advances the sequence state to S2. During sequence states S2–S5 inclusive the identifier circuits 160 operate in cooperation with originating-number flip-flops in the data transfer circuit 700 to identify and record the equipment number identity of the calling terminal.

After the completion of identification, the sequence state advances to S6, during which a signal is transmitted via a conductor of the data bus DB to the data buffer 900 of the register sender 110, to forward the information that there is a call for service. During sequence states S22 and S23 the calling number is transmitted from the data transfer circuit 700 to the data buffer 900, and the data register of the data transfer circuit 700 is cleared during state S24. The common unit then selects an idle register sender junctor such as J1, and during state S7 returns the identity thereof along with the originating number from the data buffer 900 to the data transfer circuit 700.

During sequence states S8–S19 inclusive the marker selects an idle path and makes a connection from the circuit T1 to the junctor circuit J1.

During states S20, S21, S22 and S23 a message is loaded in the data transfer circuit 700 and transmitted to the data buffer 900 to inform the register-sender that the connection has been successfully established.

During state S28 various tests are made and the marker is returned to the idle state S1.

The register-sender then causes dial tone to be returned to the calling line via the junctor and the network connection to the line or trunk circuit, and dialed digits are received via this connection and recorded in the memory. The common unit then uses the translator and route selector circuits to select a terminating line or trunk circuit such as TN, and the originating and terminating numbers are supplied to the data buffer 900.

The data buffer 900 transmits a signal via a conductor of the data bus DB to the marker, designating a common call for service, which advances the marker sequence state from S1 to S7.

During state S7 and the data is transmitted from the data buffer 900 to the data transfer circuit 700, and during states S8–S19 the connection to the register-sender junctor J1 is dropped and a connection is established between the originating circuit T1 and the terminating circuit TN via the switching network 201.

During states S20, S21, S22 and S23 a message is again loaded in the data register 700 and transmitted to the data buffer 900 to inform the register sender that the connection has been completed satisfactorily.

Again during state S28 various tests are made and the marker is returned to the idle state S1.

Address and timing generators

Figure 4:
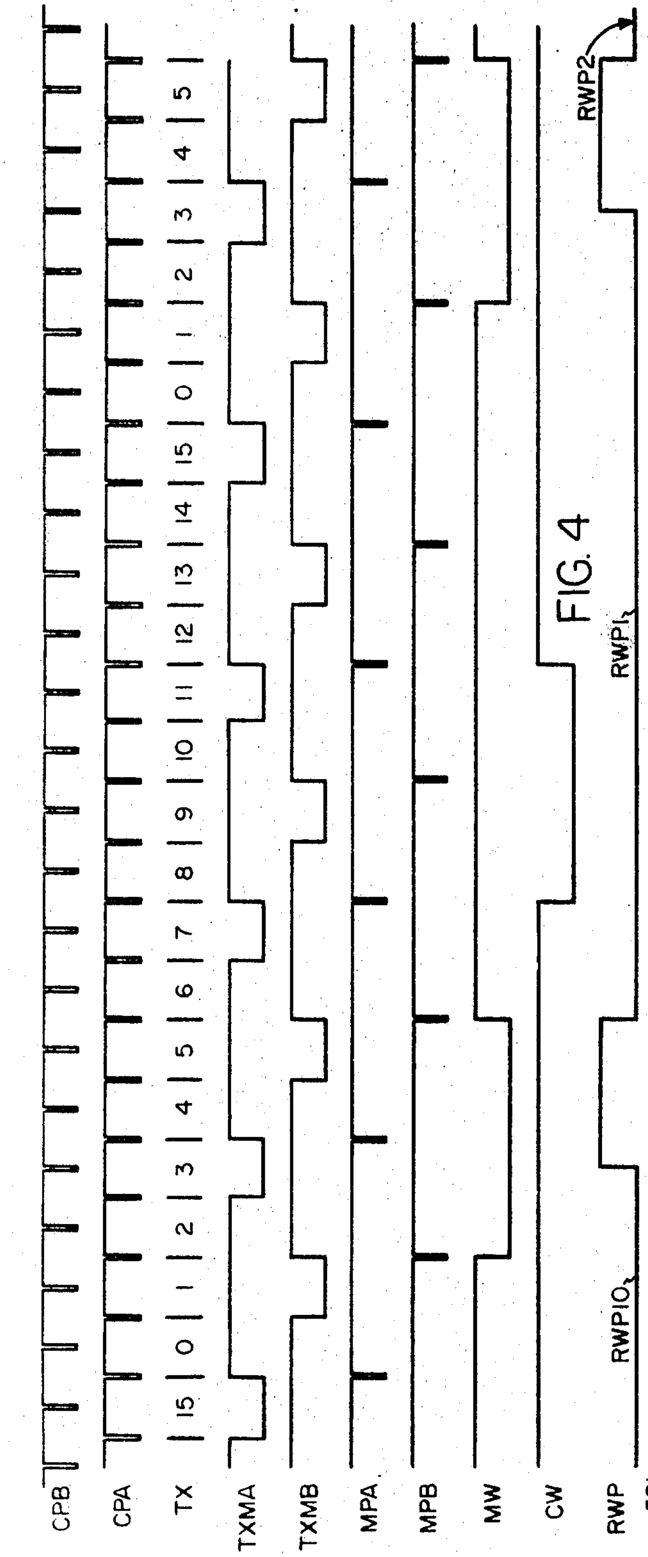
FIG. 4 is a set of graphs showing the clock pulses and other synchronizing signals.
Figure 5:
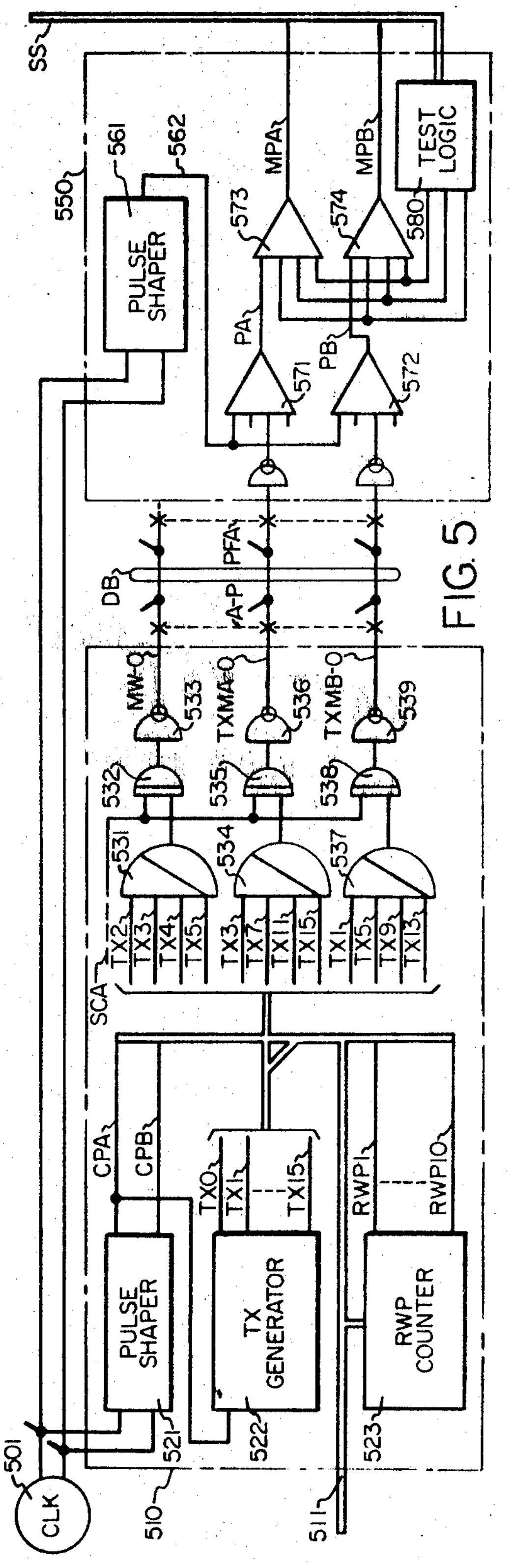
FIG. 5 is a functional block diagram of the timing and address generators of the two units.

FIG. 4 comprises a set of graphs showing the clock pulses and timing signals; and FIG. 5 shows the address generator 510 of the common unit and the timing generator 550 of the marker which generate these signals. The address generator and its output signals are more fully described in said Memory Sharing patent applications. A master oscillator or clock 501 is shown which supplies a sine wave signal to all of the units of the system. The clock supplies a signal at 100 kilohertz. In the address generator 510 the signal is supplied to a pulse shaper 521 which converts the signal into two clock pulse trains on leads CPA and CPB. Each train consists of one-microsecond pulses that occur every ten microseconds, with the two trains being displaced in time from one another by five microseconds. The signals are represented by the first two graphs in FIG. 4.

The train of pulses on lead CPA is connected to a TX generator 522, which comprises a sixteen-bit ring counter producing output signals in sequence on sixteen leads TX0, TX1–TX15. Each cycle of the TX generator comprises one operation cycle of the common unit. The TX intervals are shown on the graph TX in FIG. 4. Note that each of the intervals has a duration of ten microseconds and begins with the leading edge of a clock pulse CPA.

As described in said Memory Sharing applications, each register-sender junctor has eight words of memory, with each TX operation cycle being used to provide access to one word. The first and second words are accessed twice, so that each register-sender junctor requires ten operation cycles. The access to the different words is controlled by signals from a register word pulse counter 523 which supplies signals in sequence, one per operation cycle, on the leads RWP1–FWP10. The signal on each of these leads lasts during an operation cycle from the beginning of interval TX6 to the middle of interval of TX3 of the next cycle. The graph RWP in FIG. 4 shows the end of the pulse on lead RWP10, the entire pulse on lead RWP1, and the beginning of the pulse on lead RWP2. Each of the twenty-four register-sender junctors has access to the memory and use of the common logic circuits of the register-sender subsystem 110 for ten operation cycles in turn, thereby requiring a total of 240 TX operation cycles for a complete register-sender cycle.

The address generator 510 supplies synchronizing signals to the marker via the gates 531–539. Gate 531, during each operation cycle supplies a marker window signal during the intervals TX2–TX5 inclusive; gate 534 supplies a signal TXMA during each of the intervals TX3, TX7, TX11 and TX15; and gate 537 supplies a signal TXMB during each of the intervals TX1, TX5, TX9 and TX13. The outputs of these three gates are gated via the gate 532, 535 and 538 respectively when a signal SCA (Stop clock) is true; and these signals are inverted to the ground level by inverters 533, 536 and 539 and supplied via the conductors MW–0, TXMA–0 and TXMB–0 the data bus to the marker. The signals are shown on respective graphs in FIG. 4.

The timing generator 550 in the marker includes a pulse shaper 561 which receives the sine wave signal from the clock 501, and supplies clock pulses corresponding to those on lead CPA to gated pulse amplifiers 571 and 572. The signals from the leads TXMA–0 and TXMB–0 are inverted and supplied as direct-current control signals to the gated pulse amplifiers to cause them to supply signals on leads PA and PB respectively. The signals are then supplied respectively to the pulse inputs of gated pulse amplifiers 573 and 574. These latter gated pulse amplifiers are supplied with various signals from test logic 580 to permit the clock pulse trains to be stopped for maintenance and trouble-shooting purposes. The outputs from these gated pulse amplifiers appear on leads MPA and MPB respectively. The signals are trains of one microsecond pulses occurring every forty microseconds with the two trains being displaced in time from one another by twenty microseconds, as shown by the graphs MPA and MPB in FIG. 4.

Sequence and supervisory circuits of marker

Figure 6:
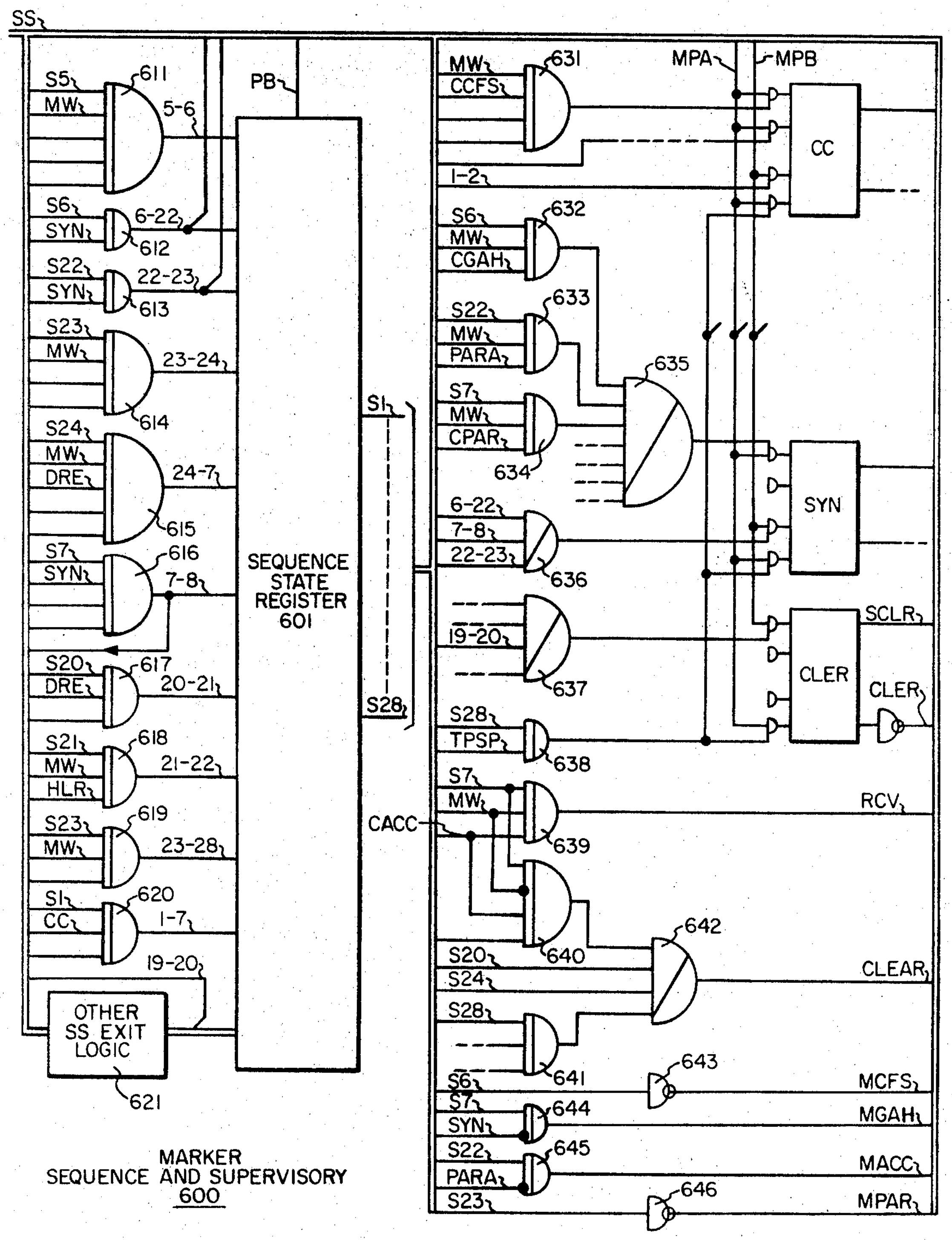
FIG. 6 is a simplified functional block diagram of the sequence and supervisory circuits of the marker unit.

Part of the marker sequence and supervisory circuits 600 are shown by a functional block diagram in FIG. 6. The basic portion of the circuit is a sequence state register 601, which comprises five flip-flops along with associated decode logic, etc. to supply a signal to one of the output conductors S1–S28 at a time. The inputs are supplied via logic circuits to control the change of states in accordance with the flow chart of FIG. 3. All normal changes of sequence state occur at the "B" clock pulse time, in response to pulses on lead PB via a gated pulse amplifier in block 601, to the capacitance-coupled inputs of the flip-flop gates. The portion of the logic relevant to the data communication with the common unit is shown by gates 611–620, and the other sequence-state-exit logic is shown as a block 621. Furthermore, at the input of the gates 611–620, only the signals relevant to the operation being considered herein are identified.

The signals shown in FIG. 6 as well as FIG. 7 other than the sequence state signals S1–S28 are as follows:

CC—Common control call
CCFS—Common control call for service
CGAH—Common control go ahead—Common control register is ready to receive information from the marker
CLEAR—Clear data transfer register
CLER—Output of a flip-flop for controlling the CLEAR operation
CPAR—Common control parity—A command from the common control indicating that the information which was received in the marker's data transfer register is the same as that sent by the common control
DRE—Data register empty
EOL—Electronic "on-line" signal from the allotter AL
HLR—Have loaded register
MACC—Market accept—A command from the marker to common control enabling the common control register to receive information from the marker's data transfer circuit.
PARA—Information sent to the common control from the data transfer flip-flops was properly received
MCFS—A marker call for service to common control—The marker has information in its data register and requires a register-sender junctor
MGAH—Marker go-ahead—Command sent to common control by a marker during state S7 indicating that the data transfer register in the marker is ready to receive information from common
MPAR—Marker parity—Command from marker to common indicating that information received by common is the same as that sent by marker
RCV—Marker is receiving information from common
SCLR—Set "Clear" information into the PR1 flip-flop of the data register
SOM—Send to "off-line" marker the RCV command
SYN—Synchronizing flip-flop used when communicating with common FIG. 6 shows three of several control flip-flops which are present in the sequence of supervisory circuits, namely CC, SYN and CLER. Flip-flop CC is set when a call for service is received from the common system. The flip-flop SYN is used to synchronize the change of sequence states during communication with common. The flip-flop CLER is used to control the clearing of certain flip-flops. Several signals from the sequence and supervisory circuits are supplied to the data register including a signal RCV and a signal CLEAR. There are four control signals which are supplied from the sequence and supervisory circuits via the data bus DB to the common control, these being MCFS, MGAH, MACC and MPAR.

Data transfer circuit of marker

Figure 7:
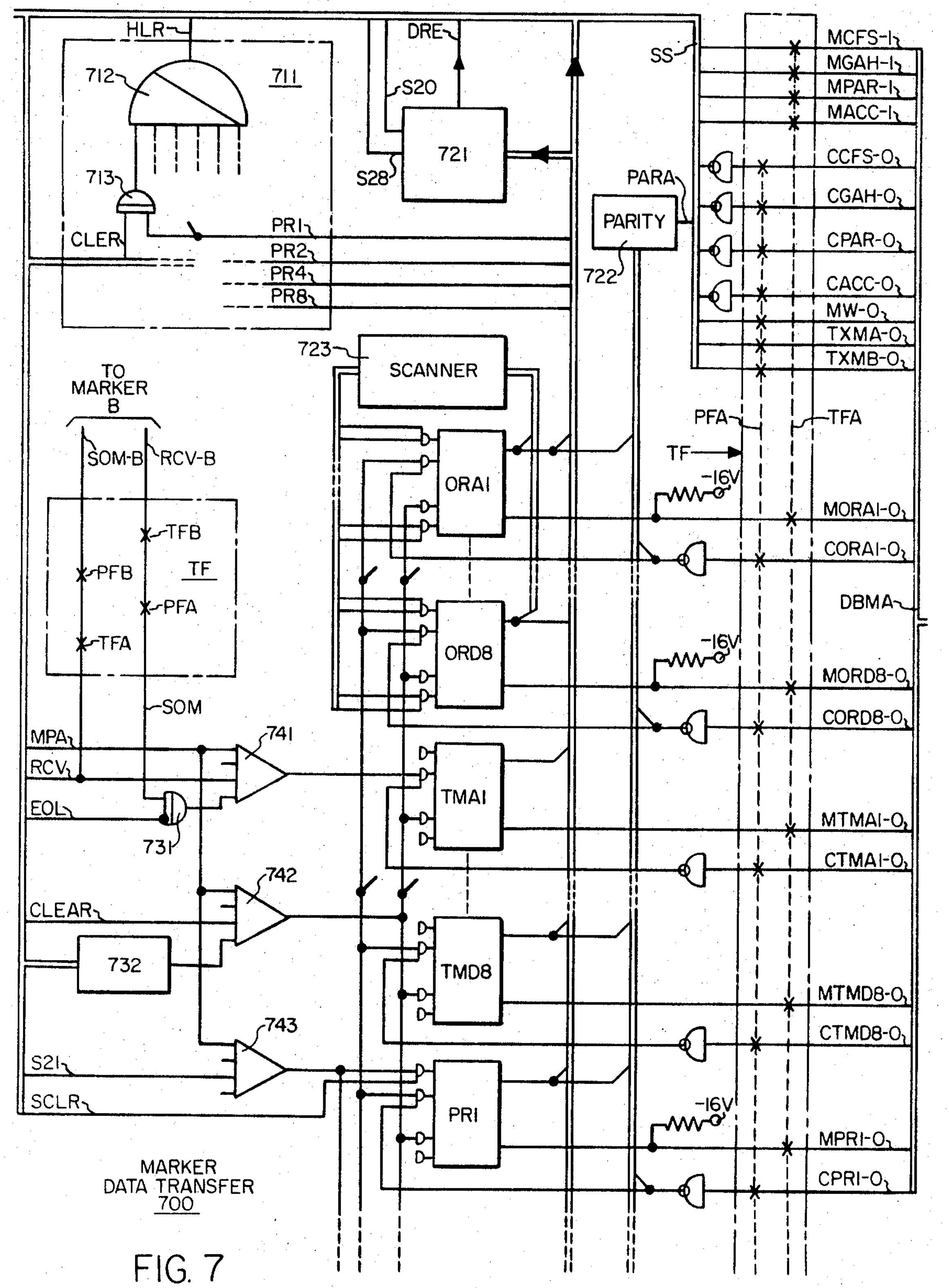
FIG. 7 is a simplified functional block diagram of the marker data transfer circuits.

The marker data transfer circuit 700 is shown by a functional block diagram in FIG. 7. The data register itself comprises several flip-flops, of which five are shown in FIG. 7. The designation of each flip-flop includes a number at the end which designates the binary value for the coding of a decimal digit, each digit requiring four flip-flops designated 1, 2, 4 and 8. There are sixteen flip-flops ORA1–8, ORB1–8, ORC1–8 and ORD1–8, of which the first and last are shown in FIG. 7, for storing the four decimal digits of an originating number; and sixteen flip-flops TMA1–TMD8 for storing the four decimal digits of a terminating number. There are four flip-flops PR1, PR2, PR4 and PR8, of which the first is shown in FIG. 7, which are used for receiving called priority information from the common system, and are also used to send status messages from the marker. There are also several other flip-flops not shown which are used only for receiving information relating to a call from the common system.

Scanner logic 723 operates in conjunction with the flip-flops ORA1–ORD8 and the identifier 160 during the identification process of sequence states S2–S5. A gated pulse amplifier 741 is used to control loading of the data register flip-flops while receiving from the common system; a gated pulse amplifier 742 is used to clear the data register; and a gated pulse amplifier 743 is used to load a status message into the flip-flops PR1, PR2, PR4 and PR8. There are other logic circuits shown in FIG. 7 which will be explained with a detailed description of the operation.

Data buffer of common system

Figure 8:
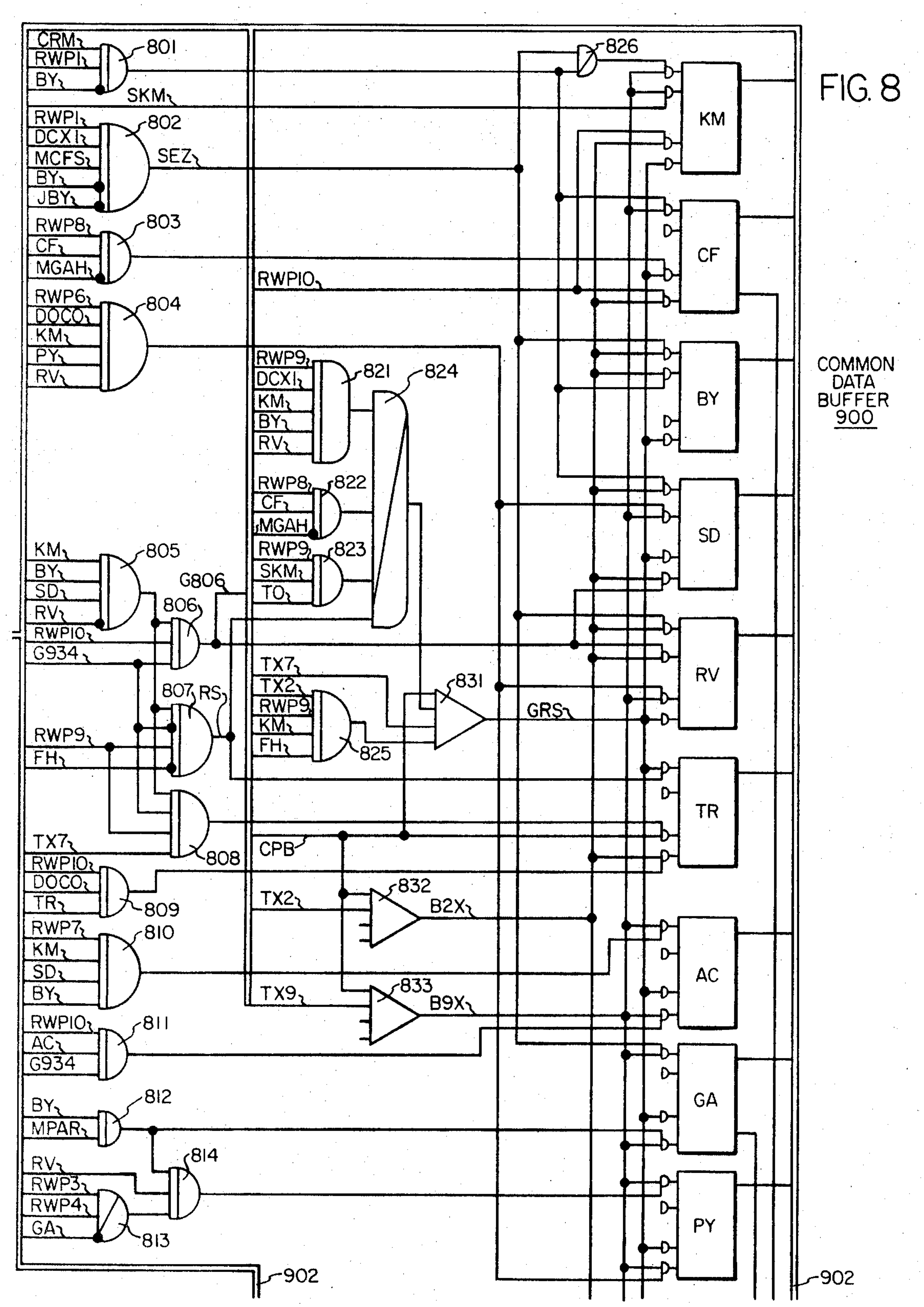
FIGS. 8 and 9 with FIG. 8 placed above FIG. 9 comprise a simplified functional block diagram of the data buffer of the common unit.
Figure 9:
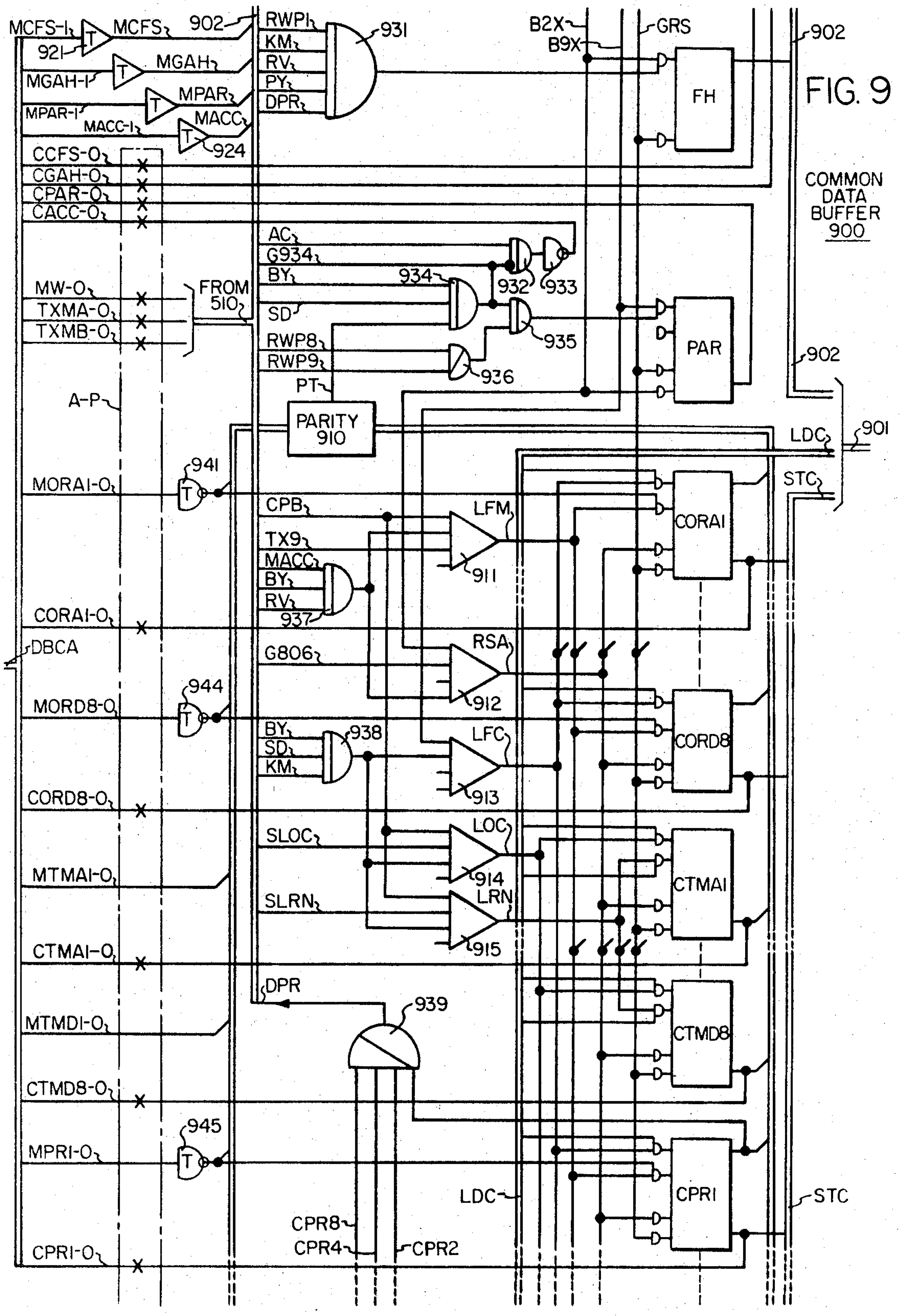

The data buffer 900 of the register sender 110 in the common system is shown in FIGS. 8 and 9, with FIG. 8 placed above FIG. 9. The data register itself, shown on FIG. 9, comprises flip-flops corresponding to those in the data transfer circuit 700 of the marker; namely, sixteen flip-flops CORA1–CORD8 for the four digits of an originating number, sixteen flip-flops CTMA1–CTMD8 for the four digits of a terminating number, four flip-flops CPR1, CPR2, CPR4 and CPR8, of which the first is shown in FIG. 9, for priority information to the marker or a status message from the marker, and several other flip-flops not shown.

Pulse inputs to the data flip-flops are supplied from the gated pulse amplifiers 911–915. The gated pulse amplifier 911 supplies a pulse signal on lead LFM (load from marker) to receive information from the marker via the data bus; the gated pulse amplifier 912 supplies a pulse signal on lead RSA to reset the data flip-flops in preparation for receiving information; and the three gated pulse amplifiers 913–915 supply pulse signals on leads LFC (load from common), LOC (load out of common), and LRN (load register number), to load information from the register-sender section of the memory or the equipment number of a register-sender junctor.

The set of conductors LDC is used to receive direct-current data signals from the register-sender memory, or from logic circuits supplying the equipment number of a junctor, for loading into the data flip-flops. The set of conductors STC supply the signals from the data flip-flops to the memory for storage.

FIG. 8 and part of FIG. 9 show several sequence control flip-flops for the data buffer, and input logic for them. These flip-flops are identified as follows:

KM—Key to marker
CF—Call for service
BY—Marker data buffer busy
SD—Send mode
RV—Receive mode
TR—Trouble indicator
AC—Accept Data
GA—Send allowed "go ahead"
PY—Parity on data
FH—Finished
PAR—Parity to the marker Several of the input signals in FIGS. 8 and 9 are received from the address generator in FIG. 5 (see also the graphs of FIG. 4), namely the clock pulses CPA and CPB, the TX interval signals TX0–TX15, and the register word pulse signals RWP1–RWP10.

The four signals MCFS, MGAH, MPAR, and MACC are described in the section on the marker data transfer circuit.

Other signals recived from the register-sender circuits are as follows:

CRM—Common system requests service from the marker
DCX1—A register-sender junctor idle state—The first of several call processing sequence states
DOCO—A call for service state indicating access by marker, which is true when the signal BY is true in coincidence with the sequence state signal DCX1 or the following sequence state DCX2
JBY—Junctor busy—Indicates that the register junctor is in use or is not available for service
SKM—Indicates to the marker data buffer that the register-sender justor whose time slot is occurring is using the marker data bus. Generated as a function being in certain DCX sequence states.
TO—Time Out—Used in the register-sender to prevent the call being processed to remain in any sequence state for an excessive amount of time.

The gated pulse amplifier 831 supplies a general reset command on lead GRS to the sequence flip-flops and the data flip-flops. The gated pulse amplifiers 832 and 833 gate the clock pulse CPB to the leads B2X and B9X respectively, during the intervals TX2 and TX9 respectively of each operation cycle, to supply pulse signals to the inputs of the sequence flip-flops.

Data bus and comparison checks

The data bus DB is shown on FIGS. 1 and 2, and the branches DBMA and DBCA are shown on FIGS. 7 and 9 respectively. As an example of one of the data conductors, consider the output from the "zero" side of the flip-flop ORA1 in FIG. 7, which extends through transfer contacts TFA to the conductor MORA1–0, and thence over the data bus to FIG. 9 and via an inverter 941 to the D.C. input of one of the coincidence gates for setting the flip-flop CORA1. In like manner the output from the "zero" side of the flip-flop CORA1 extends through transfer contacts A–P to the conductor CORA1–0 and thence over the data bus and via an inverter to the D.C. input of one of the coincidence gates for setting the flip-flop ORA1. The two conductors MORA1–0 and CORA1–0 comprise a twisted shielded pair. There are similar pairs of conductors extending between the other originating number flip-flops ORA2–ORD8 and CORA2–CORD8, and also between the four flip-flops PR1–PR8 and the four flip-flops CPR1–CPR8 of which PR1 is shown in FIG. 7 and CPR1 is shown in FIG. 9. There are data conductors similarly connected from the other data flip-flops except that the conductors extending from the outputs of the data flip-flops in FIG. 7 are not connected to the inputs of the corresponding flip-flops in FIG. 9.

For the control signal conductors of the data bus, the conductors MACC–1 and MGAH–1 are paired and shielded, the conductor MCFS–1 is paired with a ground conductor not shown and shielded, the conductor MPAR–1 is paired with another conductor not shown and shielded the conductor CPAR–0 is paired with the conductor CACC–0 and shielded, and the conductor CGAH–0 is paired with the conductor CCFS–0 and shielded. The conductors MW–0, TXMA–0 and TXMB–0 are each single conductors individually shielded.

The parity circuit 722 shown in FIG. 7 and the parity circuit 918 shown in FIG. 9 are comparator circuits of the type described in said Comparator patent application, which are used to compare one set of data with another and to generate a signal on finding agreement. In the marker data transfer circuit 700 the outputs from the "one" side of the sixteen flip-flops ORA1–ORD8 and the four flip-flops PR1–PR8 comprise one set of signals to the parity circuit 722, and the signals from the outputs of the corresponding flip-flops in the data buffer 900 via the conductors CORA1–0 to CORD8–0 and CPR1–0 to CPR8–0, after inversion, are the other set of signals to the parity circuit 722. When each signal in the one set is equal to the corresponding signal in the other set the output signal PARA becomes true.

In the data buffer 900, the outputs from the "one" side of the flip-flops CORA1–CORD8 and CPR1–CPR8, and the outputs from the "zero" side of the other data flip-flops comprise one set of inputs to the parity circuit 910; while the signals from the leads MORA1–0 to MORD8–0 and MPR1–0 to MPR8–0 inverted, and the other signals MTMA1–0 etc., not inverted, comprises the other set of inputs to the parity circuit 910. When the signal on each of the leads of one set of inputs is equal to the signal on the corresponding lead in the other set of inputs the signal PT becomes true.

Priming time and windows

As explained and shown in said Building Block Description, the flip-flops each have four input coincidence gates as a part thereof, each gate having a capacitance-coupled input for pulse signals and a direct-coupled input for direct-current logic signals. These coincidence gates are shown as small semicircles on the drawing, with the capacitance-coupled input for pulse signals shown at the center of the left side, and the direct-coupled input shown connected to one side of the base of the semicircle. The coincidence gates are all shown connected to the left sides of the flip-flops, with two at the upper half for setting the flip-flop and two at the lower half for resetting it. For simplicity, unused ones of the coincidence gates are omitted from the drawing. The circuit constants of each of these gates is chosen such that a direct-current signal must be present at the direct-coupled input for at least about 1.2 microseconds before the appearance of the pulse signal at the capacitance-coupled input, to be effective in changing the state of the flip-flop. This prevents the output signals from the flip-flops from being effective at the inputs of the same or other flip-flops while the pulse signal which causes a change of state is still present. This arrangement permits an orderly sequence of operations without critical timing in the logic circuits. However, in the transfer of data between two subsystems which have different pulse sources, the timing might become critical. For example in FIG. 9 if the signals on the leads MORA1–0 and the other input data leads arrive shortly before the clock pulse is applied for the loading gates of the flip-flops CORA1 etc., some of the coincidence gates might have been adequately primed and others not. Furthermore the leads such as MORA1–0 are connected in multiple to corresponding flip-flops in the common units B and C, which must be primed to receive the same data. To overcome this problem the arrangement disclosed herein provides the marker window MW and common window CW shown on the graphs of FIG. 4. These window intervals are used so that the marker sends information only during its window and the common system only loads the information into its data flip-flops during the common window which occurs some time later. In like manner the common system sends data during the common window, and the marker accepts it during the marker window.

It may be useful to review the operation of the gated pulse amplifiers, as disclosed in said Building Block Description. Each of them is shown as a triangle with four input signals at the base on the left side and an output signal at the apex on the right hand side. The upper input signal in each case is a capacitance-coupled input for pulse signals, and the other three inputs are direct-coupled control inputs. The control inputs are arranged so that signals in coincidence at the second and third inputs are effective for a pulse at the upper input to be gated to the output, or a signal at the lower input is also effective to gate the pulse. If only one of the second or third inputs is used it is effective by itself to gate the pulse.

Detailed operation for data transfer

The data transfer operation for the communication of data via the data bus will be explained with reference to the call described in the section on "System Operation," with reference to the marker flow chart of FIG. 3.

After the call is initiated via the line or trunk circuit T1, which advances the sequence state from S1 to S2; and the equipment number of the calling terminal T1 is identified during the sequence states S2–S5 by the identifier 160 operating in conjunction with the scanner 723 (FIG. 7), the equipment number is recorded in the flip-flops ORA1–ORD8.

With the identification successfully completed, the lower three inputs (not identified) of gate 611 have true inputs thereon, and the signal S5 at the upper input is also true. Then upon the next occurrence of the marker window signal on lead MW the gate is enabled to advance the sequence state from S5 to S6. The signal on lead S6 via the buffer gate 643 is applied to lead MCFS, and via the relay contacts TFA (FIG. 7) supplied to the data bus conductor MCFS–1 to inform the common control system of the marker call for service.

In the common data buffer, the signal is received via the buffer test gate 921 and supplied via the set of conductors 902 to gate 802. Since the data buffer is idle the flip-flop BY is in the reset condition, so that the signal at the BY inhibit input is false, which is the proper condition for enabling the gate. During the first register word pulse interval RWP1 of each register-sender junctor time slot the junctor is checked for availability at the inputs of gate 802. If the junctor is idle the signal DCX1 is true and the signal JBY is false. In the first junctor time slot in which these conditions are met, the signal SEZ from the output of gate 802 becomes true. This signal is applied via OR gate 826 to the D.C. input of the first set input coincidence gate of flip-flop KM, and directly to the D.C. inputs of the upper coincidence gates of flip-flops BY, RV, and GA. Note in FIG. 4 that the signal RWP1, and therefore the signal SEZ, becomes true during interval TX6. During interval TX9 the pulse signal on lead B9X from the gated pulse amplifier 833 sets the flip-flops KM and GA, and during the interval TX2 the pulse signal on lead B2X from gated pulse amplifier 832 sets the flip-flops BY and RV. The setting of flip-flop KM is used as a key to indicate which register-sender junctor is using the data buffer 900. The setting of flip-flop BY makes the data buffer busy. The setting of flip-flop RV puts the data buffer into the receive mode. The "0" output from flip-flop GA is supplied via relay contacts A–P to the lead CGAH–0 of the data bus to send a go-ahead signal to the marker.

In the marker the signal on lead CGAH–0 is received via relay contacts PFA, inverted and supplied via the set of conductors SS to gate 632. During the next marker window the signal on lead MW enables gate 632, which via OR gate 635 supplies the signal to the D.C. input of the upper coincidence gate of the flip-flop SYN so that it is set by the pulse on lead MPA. The signal on lead SYN at gate 612 causes the sequence state to advance from S6 to S22. The signal on lead 6–22 from gate 612 also via OR gate 636 supplies a signal to a reset coincidence gate to reset the flip-flop SYN upon the next occurrence of the pulse on lead MBP. At this time the signal PARA from the parity check comparator circuit 722 is false, so that the signal on lead S22 enables gate 645 to generate the marker accept signal MACC which is forwarded via the relay contacts TFA and the lead MACC–1 of the data bus.

In the common data buffer 900, the D.C. signals on the leads MORA1–0 to MORD8–0 are applied via sixteen inverter test gates 941–944 to the D.C. inputs of the second coincidence gates for setting the flip-flops CORA1–CORD8. The signal on lead MACC–1 is supplied via a buffer test gate 924 and lead MACC of the set of conductors 902 to an input of gate 937. The signals BY and RV are also true so that a true signal is applied to control inputs of the gated pulse amplifiers 911 and 912. Then during the common window the pulse on lead B9X (interval TX9) enables the gated pulse amplifier 911 to supply a pulse on lead LFM to set those of flip-flops CORA1–CORD8 which have received D.C. input signals from the marker. Therefore the originating equipment number now appears in these flip-flops. The outputs of these flip-flops from the "zero" side are sent back to the marker via relay contacts A–P and the leads CORA1–0 to CORD8–0.

In the marker data transfer circuit 700, the signals on leads CORA1–0 to CORD8–0 are applied via contacts of relay PFA and inverters as a set of inputs to the parity check circuit 722. The outputs from the flip-flops ORA1–ORD8 along with those from the flip-flops PR1–8 are applied as the other set of inputs to the parity check circuit. If these two sets of data are equal bit for bit, the signal PARA becomes true. However assume that because of noise on the data bus or some other cause parity comparison is not achieved; then this signal PARA remains false, the marker remains in state S22, and the signal on lead MACC–1 remains true.

In the common data buffer 900, the signal from gate 937 remains true, then during the next operation cycle the signal on lead B2X enables the gated pulse amplifier 912 to supply a pulse on lead RSA to reset the flip-flops CORA1–CORD8. Then during the common window the signal on lead TX9 again becomes true to enable gated pulse amplifier 911 to gate the pulse CPB to lead CFM to again set the flip-flops CORA1–CORD8 in accordance with the D.C. signals received via the data bus.

The signal MACC remains until a comparison is found by the comparison check circuit 722, and during each operation cycle the common data buffer flip-flops are reset and a new attempt is made to load the correct information. Assume that the second attempt is successful.

In the marker, when the valid comparison is found and the circuit 722 generates a true signal PARA, gate 645 is inhibited to make the signal MACC false, which normally occurs before the end of the common window. During the next marker window, the three inputs S22, MW and PARA to gate 633 are all true, so that a signal is supplied via OR gate 635 to the D.C. input of flip-flop SYN which is set on the next occurrence of a pulse on lead MPA. The signals S22 and SYN at gate 613 cause the sequence state to advance from S22 to S23, and the signal on lead 22–23 via gate 636 causes the flip-flop SYN to be reset on the next occurrence of a pulse on lead MPB. The signal on lead S23 via a buffer gate 646 makes the signal on lead MPAR true, and this signal is forwarded via relay contacts TFA and conductor MPAR–1 to the common system.

In the common data buffer 900, the signal on lead MPAR–1 via the test buffer gate supplies the signal MPAR to gate 812. Since the signal on lead BY is still true the signal is supplied from gate 812 to the lower D.C. input of flip-flop GA, which is reset on the next occurrence of a pulse on lead B9X during the common window to remove the go-ahead signal from lead CGAH–1 to the marker. During the third or fourth junctor words, the register word pulses RWP3 or RWP4 are supplied via gate 813 as an input to gate 814. The data buffer is still in the receive mode so that the signal RV is true, and the gate 814 is enabled to supply a signal to the D.C. input of flip-flop PY, which is set upon an occurrence of a pulse on lead B9X, which is during the common window. During the register word pulse RWP5, the originating number information from flip-flop CORA1–CORD8 is stored via the set of conductors STC and other register-sender circuits into row 5 of the section of memory for that junctor.

During the register word pulse RWP6, the data buffer 900 is placed in the sending mode. At this time all of the input signals to gate 804 are true, the output thereof is supplied to inputs for setting the flip-flops SD and for resetting flip-flops RV and PY, in response to a signal on lead B9X. With the data buffer in the send mode the signals BY, SD and KM enable gate 938, and at the same time other logic circuits in the register-sender logic supply a true signal via the lead SLRN, and these signals in coincidence enable the gated pulse amplifier 915 to gate the next pulse on lead CPB to the lead LRN to load the register-sender junctor number which is supplied via the set of conductors LDC into the flip-flops CTMA1–CTMD8.

In the meantime in the marker, during the next marker window after sending the signal MPAR, the gate 614 is enabled. At this time in the call processing the two unidentified inputs of gate 614 are true. The sequence state advances from S23 to S24. The signal on lead S24 via gate 642 sends the signal on lead CLEAR, which enables the gated pulse amplifier 742 to gate the next pulse on lead MPA to reset all of the flip-flops of the data register. In response to all of the data flip-flops being in the reset condition, the set of logic 721 makes the signals on lead DRE true. This signal in conjunction with the signals S24, MW and other conditions enables gate 615 to advance the sequence from state S24 to S7. The signal S7 via gate 644 supplies a signal to the MGAH, which via relay contacts TFA and data bus conductor MGAH–1 is sent to the common system.

Returning to the operation proceeding in the common data buffer 900, during the occurrence of the register word pulse RWP7, in coincidence with the signals KM, SD and BY, gate 810 is enabled to supply a signal to flip-flop AC, which is set during the common window in reponse to the pulse signal on lead B9X. The output from flip-flop AC is forwarded via gate 932, and inverted at gate 933 and via contacts A–P places a signal on lead CACC–0 as a common control accept signal to the marker to inform it that the register-number has been loaded onto the data bus.

In the marker, during the marker window the accept signal is acknowledged by the signals S7, MW and CACC at gate 639 being true to supply a signal on lead RCV. This signal enables the gated pulse amplifier 741 to gate the next pulse on lead MPA to load the data from the marker data bus into the data register flip-flops. Note that the signals originally occur on the data bus conductors CORA1–0 to CORD8–0 which contains the originating terminal number which is still present in the common data buffer, and on leads MPMA1–0 to MPMB8–0 which contain the register-sender junctor number. The interval from the common window to the marker window insures adequate time for propagating the signals over the data bus and priming the data flip-flops at their D.C. inputs. The data is also loaded into the other marker, the signal on lead RCV being supplied via contacts TFA and TFB to lead SOM–B. When marker B is on line, the signal RCV–B in that marker is supplied via contacts TFB and PFA to gate 731 which in conjunction with the electronic "on line" signal EOL at the inhibit input being false enables the gated pulse amplifier 741. The data loaded in the data buffer is returned via the leads MORA1–0 etc. of the data bus.

In the common data buffer 900, the outputs of the data flip-flops CORA1 etc. are supplied as one set of inputs to the parity check circuits 910, and the signals from the data bus MORA1 etc. are supplied with another set of inputs thereto. When these two sets of data compare bit for bit, the signal PT becomes true, which in coincidence with the signals BY and SD enables gate 934. The output at this gate is supplied via conductor G934 of the set of conductors 902 to gates 806 and 811, as an inhibit input to gate 932, and as an input to gate 935. The inhibiting of gate 932 causes the accept signal on the data bus conductor CACC–0 to be removed during the marker window, indicating to the marker that the information has been successfully received.

In the marker, during the marker window the signal on lead MW inhibits gate 640 which has all of the other inputs true. If the signal on lead CACC is removed before the end of the marker window that input becomes false so that the output of gate 640 remains false. However if the signal remains beyond the end of the marker window when the signal on lead MW becomes false gate 640 supplies a signal via OR gate 642 to make the signal and lead CLEAR true, which via gated pulse amplifier 742 gates the next pulse on lead MPA to reset the data flip-flops ORA1 etc. In this case during the next marker window when the signal MW again becomes true the signal on lead RCV via gate 639 becomes true, so that the gated pulse amplifier 741 is again enabled to pass the pulse on lead MPA for another attempt to load the data from the data bus into the data flip-flops.

In the common data buffer 900, if the marker has successfully received the information either on the first attempt during the register word pulse RWP8, or on the second attempt during the register word pulse RWP9, the output of gate 936 becomes true, which in coincidence with the successful parity test on lead PT via gate 934, enables gate 935 to supply an input signal to flip-flop PAR which is set during the common window on the next occurrence of a pulse on lead B9X. The output of flip-flop PAR is supplied via contacts A–P to the data bus conductor CPAR–0 to signal parity to the marker.

During word nine time the register-sender circuits 110 use the output from flip-flop KM to advance from the idle state DCX1 to DCX2. Only one junctor can have this sequence state at any time so that it is thus identified as the using the data buffer.

In the next operation cycle the register word pulse RWP10 supplies reset signals to flip-flops KM and CF, and in coincidence with the successful parity signal via gate 934 enables the gates 806 and 811. The output of gate 806 is supplied as a reset signal for the send mode flip-flop SD and a set signal for the flip-flop RV. The output of gate 811 is supplied as a reset signal for flip-flop AC. The pulse on lead B9X resets the flip-flop AC, and the pulse on B2X resets flip-flops KM, CF and SD, and sets flip-flop RV. This completes the time slot of the register-sender junctor.

In the marker, after receiving the parity signal on lead CPAR, during the next occurrence of the marker window the gate 634 is enabled to supply a signal via gate 635 to set the flip-flop SYN on the next occurrence of a pulse on lead MPA. At gate 616 the signals S7, SYN and other conditions when they become true enable the gate 616 to advance the sequence from state S7 to state S8.

During the sequence states S8–S19 the marker performs various matrix pathfinding and connect operations to establish the connection from the originating terminal T1 through the switching network T1 to the selected junctor J1. After the connection is successfully completed and various tests are performed, the logic 621 generates a signal 19–20 to advance the sequence state to S20. The signal 19–20 via an OR gate 637 supplies an input signal to flip-flop CLER, which is set upon the next occurrence of a pulse on lead MPB. The signal on lead S20 via OR gate 642 supplies a signal on lead CLEAR which enables the gated pulse amplifier 742 to gate the pulse on lead MPA to reset the data register flip-flops. The logic 721 causes the signal on lead DRE to become true, which in coincidence with the signal S20 and other conditions enables gate 617 to advance the state from S20 to S21.

The sequence state S21 is for loading a marker status message into the four flip-flops PR1–8. There are several such messages possible, but on this call we have assumed that the message is to indicate successful completion of the connection, which requires that only flip-flop PR1 be set. This is accomplished by the signal SCLR from the "1" side of flip-flop CLER supplied as a D.C. input to flip-flop PR1. The signal S21 enables the gated pulse amplifier 743 which is supplied as a pulse input to the flip-flops PR1–8 so that flip-flop PR1 is set. After the status message has been successfully loaded the logic 711 causes the signal on lead HLR to become true. In this case the logic comprises coincidence of the signals CLEAR and PR1 via gates 713 and OR gate 712. During the next occurrence of the marker window the signals S21, MW and HLR at gate 618 cause the sequence state to advance from S21 to S22. The signal on lead S22 via gate 645 supplies the accept signal MACC via the data bus to the common system.

The common data buffer 900 is held busy (flip-flop BY remains set) while waiting for the marker to complete the connection and return the status message. The identification of the junctor which is using the data buffer is accomplished by the flip-flop KM which during each complete register cycle during the first word time of the time slot for that junctor supplies the signal SKM to cause it to be set in response to the signal on lead B9X, and flip-flop KM is reset during the occurrence of the pulse RWP10. When the accept signal MACC is received from the marker, gate 937 is enabled, and during the interval TX9 the gated pulse amplifier 911 is enabled to supply the pulse from lead CPB to lead LFM to the capacitance-coupled inputs of flip-flops CORA1–CORD8 and CPR1–8. The marker status message indicating clear comprises a signal only on the lead MPR1–0 which via inverter 945 is supplied to flip-flop CPR1 to set it. Note again that the marker has loaded its data register and supplied the accept signal during the marker window, and the information is loaded into the data register of data buffer 900 during the common window in interval TX9, thus insuring adequate time for propagation of the signal and priming of the data flip-flop. The output of the flip-flop is returned via contacts A–P and lead CPR1–0 to the marker for a parity check.

In the marker, a comparison check is made by the parity circuit 722 as before to generate the signal on lead PARA if the information has been successfully transmitted. There may be a second attempt if parity is not achieved on the first transmission as before. When parity is achieved, gate 645 is immediately inhibited to terminate signal MACC, and the flip-flop SYN is set during the marker window via gates 633 and 635, and then via gate 613 the sequence is advanced from state S22 to S23. A signal is supplied from lead S23 via buffer gate 646 to the conductor MPAR to send the parity signal to the common system.

In the common data buffer 900, the signal MPAR in coincidence with the signal on lead BY via gate 812, and then during the reigister word pulses RWP3 or RWP4 via gate 813, and coincidence of the signal on lead RV the gate 814 supplies the signal to set the flip-flop PY when a pulse occurs on lead T9X. With the message correctly stored, the signal from the output of one or more of the flip-flops CPR1–8, in this case from CPR1, a signal DPR becomes true on the output of gate 939, and this signal is supplied as an input to gate 931. At this time the signals on leads RV and PY are also true. On the next occurrence of the time slot for this junctor the flip-flop KM is set in response to the signal on lead SKM, during the occurrence of the register word pulse RWP1. Therefore all of the inputs of gate 931 are true to thereby supply a D.C. input signal to flip-flop FH, which is set on the next occurrence of a pulse on lead B2X. The marker status message is stored in the memory for the junctor via the set of leads STC.

Upon reaching the time of the register word pulse RWP9, during interval TX2, the signals on leads KM and FH being true, the gate 825 supplies a signal to enable the gated pulse amplifier 831, to gate the next pulse on lead CPB to the lead GRS as a general reset command. This resets all of the sequence control and data flip-flops of the data buffer 900 except flip-flop TR if it has been set. Therefore the data buffer is returned to idle and is available for use on another call.

In the marker data transfer circuit 700, after sending the parity signal on lead MPAR, upon the next occurrence of the marker window the gate 619 is enabled to advance the sequence state from S23 to S28. The lower input of gate 619 is true during this phase of the operation. In state S28 the marker makes several tests, and then advances to the idle state S1. The marker is now available for other calls.

After the calling digits have been received, the translation and route selection process has been completed, and the identity of the selected called terminal has been stored in the register-sender junctor memory, the service of the marker is requested for making the final connection. In the common data buffer 900 a signal CRM is supplied to gate 801. If the data buffer is not busy the signal on lead BY will be false and therefore will not inhibit this gate so that during the register word pulse RWP1 the signal is supplied to the D.C. input of flip-flops CF, BY, SD and via OR gate 826 to flip-flop KM. During the interval TX9 the pulse on lead B9X will set the flip-flops CF and KM, and during interval TX2 the pulse on lead B2X will set the flip-flops BY and SD. The flip-flop KM provides a key to identify the junctor using the data buffer, flip-flop BY makes the buffer busy, and flip-flop SD places it in the send mode. Flip-flop CF provides a call for service signal, its output from the "zero" side being taken via contacts A–P to the lead CCFF–0 of the data bus.

Gate 938 is enabled by the signals on leads BY, SD and KM being true to supply control signals to the gated pulse amplifiers 913 and 914. A control signal SLOC is also supplied to the gated pulse amplifier 914. D.C. control signals for loading information from memory is supplied at the appropriate time via conductors of the set LDC so that the originating number is loaded from row 5 of the junctor memory into flip-flops CORA1–CORD8 in response to a pulse on lead LFC from the gated pulse amplifier 913; the terminating equipment number is loaded from row 6 of the memory into flip-flops CTMA1–CTMD8 in response to a pulse on lead LOC from gated pulse amplifier 914. Other call processing information may also be loaded into the other flip-flops of the data register.

In the marker, after the call for service signal is received, during the next marker window, if certain other conditions are met, the gate 631 is enabled to set the flip-flops CC in response to a pulse on lead MPA. At gate 620, if the marker is idle and therefore in sequence state S1, and another condition is true, the gate is enabled to change the sequence state from S1 to S7. If it happens that the marker is busy with another call, and therefore is not in state S1, the signal on lead CC is ignored. Thus if the marker advances to state S7, then via gate 644 it will supply a signal on lead MGAH, whereas if it is already busy, and therefore does not advance the state, the signal MGAH remains false.

In the common data buffer 900, during row 7, the signals on leads RWP7, KM, SD and BY enable gate 810 to supply a signal input to flip-flop AC so that it is set in response to a signal on lead B9X during the common window.

If the signal on lead MGAH has not been received because the marker was already busy, then during the row 8 time the signal MGAH being false at the inhibit inputs of gate 803 and 822, in coincidence with true signals on leads RWP8 and CF, a signal is supplied from gate 803 as an input to flip-flop CF, and a signal from gate 822 via OR gate 824 supplies an input control signal to the gated pulse amplifier 831 which is then enabled when the signal appears on the lead TX7 to gate a pulse from lead CPB to lead GRS to supply a general reset signal to reset flip-flop CF and the other sequence control and data flip-flops.

Assuming that the signal on lead MGAH has been received from the marker as a go-ahead signal, the output from flip-flop AC is supplied via gates 932, the inverter 933 and contacts A–P to the lead CACC–0 to tell the marker to accept. Since the flip-flop was initially set during the common window the signal is forwarded at that time.

From this point on the operation proceeds in the same manner as in the portion of the originating call in which the register number is received from the common data buffer during marker sequence state S7. The information is received and checked in state S7, in states S8–S19 the pathfinding and connection operations occur, in state S20 the marker clears its data register, in state S21 it loads a data message, in state S22 it sends an accept signal to the common system, in state S23 it sends a parity signal, and then it advances through state S28 to the idle state S1. In like manner in the common data buffer the operations also proceed as in sending the information concerning the register number and awaiting a status message, following which it releases to the idle condition.

Trouble conditions

*No marker parity on initial request for a register-sender junctor.*—If the marker when requesting an idle register-sender junctor cannot achieve parity on the originating number, it will time out and make a trouble print-out. Lack of the marker parity (MPAR) will also cause the common data buffer 900 to return to idle. This result occurs since the selected register-sender junctor must not only receive the originating number and store it in memory during the time of word five, but also send the connecting information all within its time slot. Therefore if the signal on lead MPAR is not received during the time of either of the register word pulses RWP3 or RWP4, the time remaining in the time slot is not sufficient to complete the information storage and transfer. With the lack of parity a signal will be supplied via gates 812 and 814 to set the flip-flop PY. Then during the occurrence of the register word pulse RWP6, the lack of the true signal on lead PY will result in no signal being supplied to the flip-flops SD and RV to change from the receive to the send mode. During the time of the register word pulse RWP9, the coincidence with the signals on leads DCX1, KM, BY and RV at gate 821 supplies a signal via the OR gate 824 to the gated pulse amplifier 831. During the interval TX7 this gate pulse amplifier is enabled to supply a general reset signal on lead GRS to return the data buffer to the idle condition.

*Marker status message.*—If the marker cannot achieve parity while sending a marker status message, it will continue to try until it times out and makes a trouble print-out. The common data buffer 900 in turn will also remain busy, waiting for parity until a time-out condition occurs. Then the time-out signal on lead TO, with signals on leads RWP9 and SKM, enables gate 823, which via OR gate 824 enables the gated pulse amplifier 831 so that during the interval TX7 a pulse from lead CPB is gated to lead GRS to return the data buffer to idle.

*Parity failure after common control call for service.*—If the common data buffer 900 fails to detect parity on the information sent to the marker, it will set its trouble flip-flop TR, which causes a trouble print-out and the data buffer to be reset. With the lack of parity the signal on lead PT to gate 934 remains false, and therefore at gate 807 the false signal will fail to inhibit gate 807. Since the data buffer is in the send mode the output of gate 805 is true to enable the upper input of gate 807. When the signal on lead RWP9 becomes true, and the output of the flip-flop FH is still false so that it does not inhibit the gate at the lower input, the output signal RS becomes true to supply a D.C. input to flip-flop TR, and via gate 824 to supply an input signal to the gated pulse amplifier 831. Then during the interval TX7 the pulse appears on leads GRS to set the flip-flop TR and reset the other flip-flops. The output of flip-flop TR is used in the register-sender circuits to inhibit the same register-sender junctor from again calling for service until another call has been successfully completed in the data buffer. After successful completion of another call, the output of either gate 808 or 809 will be true to reset the flip-flop TR.

*Failure of synchronization of the outputs of the data buffer 900 for the three common units A, B and C (FIG. 2).*—If due to a false condition the three common controls lose synchronization or otherwise do not agree, the arrangement disclosed in said Configuration Control patent application will detect the condition during the interval between the two windows of the operation cycle in which data is being received in the data buffer. This will cause the trouble condition to be recorded and if repeated will cause appropriate action such as reconfiguration to occur. The two windows being spaced within the operation cycle provides adequate time between them for the configurataion control apparatus to make the comparison check of the three units.

What is claimed is:

1. In combination, a first and a second unit, each unit having a data register comprising a plurality of bistable devices, each having a first and a second stable state;

each bistable device having a plurality of inputs with a coincidence gate at each; each coincidence gate having a direct-coupled input, a capacitance-coupled input, and circuit connections so that responsive to coincidence of a direct-current signal applied at the direct-coupled input, which has been continuously applied for at least a given priming interval, and a pulse signal applied at the capacitance-coupled input, the bistable device is set to one of said states corresponding to the connection of that gate;

each said unit including a source of a train of clock pulses occurring at a regular repetition rate for synchronizing operations within that unit, means to selectively couple the source of clock pulses to the capacitance-coupled inputs of certain coincidence gates at inputs of said devices in accordance with a sequence of operations within that unit;

one of said units having a data send mode and the other unit having a data receive mode, a bata bus comprising a plurality of data and control conductors coupled from the outputs of at least some of the devices of the data register of the unit having the send mode and coupled to the direct-coupled inputs at the coincidence gates of the corresponding devices of the data register of the other unit for setting the devices to their first state;

the improvement comprising:

said first unit having an operation cycle divided into a given number of timing intervals separated by pulses from said source in that unit, means producing a "first window" interval and a "second window" interval occurring during each operation cycle during specific and completely separate timing intervals for each; means to transmit a "second window" signal to the second unit during the "second window" interval, means in said unit having the send mode for loading its data register, and means to send an "accept" signal during the "window" interval of that unit via a control conductor of the data bus to the other unit, and means responsive to the "accept" signal and effective during the "window" interval of the unit having the receive mode to couple pulses from its said source to the capacitive-coupled inputs of said coincidence gates to which said data bus data conductors are connected to thereby load the data therefrom, the time between sending the "accept" signal and coupling pulses to the gate inputs being not less than said priming time plus the propagation time via the data bus, this time being determined by the time of occurrence of said window intervals.

2. The combination as claimed in claim 1, further including comparison check apparatus having a first set of inputs coupled from the outputs of the devices of the data register of the first unit, and another set of inputs coupled from the outputs of the devices of the data register of the second unit, and an output on which a "valid comparison" signal condition appears when the signal condition on every lead of the first set of inputs is equal to the signal condition on the corresponding lead of the other set of inputs;

and means having an input coupled to said output of the comparison check apparatus, and operative responsive to the absence of the valid comparison signal condition following said window interval of the unit having the receive mode to reset the devices of the data register of that unit, to repeat the operation responsive to the "accept" signal and effective during the next occurrence of the "window" interval of the unit having the receive mode to again couple pulses from its said source to the capacitance-coupled inputs to thereby load the information from the data bus conductors.

3. The combination as claimed in claim 1, wherein said unit having the send mode includes comparison check apparatus having a first set of inputs coupled from the outputs of the devices of its own data register, and another set of inputs coupled via conductors of said data bus from the outputs of the devices of the data register of the said unit having the receiving mode, and an output on which a "valid comparison" signal condition appears when the signal condition on every lead of the first set of inputs is equal to the signal condition on the corresponding lead of the other set of inputs;

means, in the unit having the send mode, having an input coupled to the output of the comparison check apparatus, and operative responsive to said "valid comparison" signal condition to terminate said "accept" signal, the "accept" signal being continued if the "valid comparison" signal condition does not occur;

and means in the unit having the receive mode to reset the devices of its data register responsive to receiving said "accept" signal during periods outside of its "window" interval and wherein there are at least two of said operation cycles in which it is operative to couple pulses from its said source to the capacitance-coupled inputs of said coincidence gates, to thereby provide a repeated attempt to load the data from the data bus if said "valid comparison" signal condition is not obtained after the first attempt.

4. The combination as claimed in claim 3, wherein there are a plurality of units having the data receive mode, each of said data conductors being coupled in multiple to the direct-coupled inputs at the coincidence gates of corresponding devices of the data registers of each of the units having the receive mode;

and wherein the control conductor for sending the "accept" signal is also connected in multiple to all of the units having the receive mode to enable them to load the data from the data conductors into their devices during their "window" interval which occurs at the same time in all of them;

whereby all of the receive units are assured of adequate time for propagation of the data and priming of the input coincidence gates for their data registers.

5. The combination as claimed in claim 1, wherein there are a plurality of units having the data receive mode, each of said data conductors being coupled in multiple to the direct-coupled inputs at the coincidence gates of corresponding devices of the data registers of each of the units having the receive mode;

and wherein the control conductor for sending the "accept" signal is also connected in multiple to all of the units having the receive mode to enable them to load the data from the data conductors into their devices during their "window" interval which occurs at the same time in all of them;

whereby all of the receive units are assured of adequate time for propagation of the data and priming of the input coincidence gates for their data registers.

6. In a commmunication switching system, the combination as claimed in claim 1, wherein said first unit is a common unit for central processing of call information, and said second unit is a marker for controlling a switching network; said "first window" interval being a "common window" interval and said "second window" interval being a "marker window" interval;

means to place the marker unit in said send mode and the common unit in said receive mode for sending data from the marker unit to the common unit, and means to alternatively place the common unit in a send mode and the marker unit in a receive mode to send data from the common unit to the marker unit.

7. In a communication switching system, the combination as claimed in claim 6, wherein said source of clock pulses in the marker comprises a source having a first and a second output with a train of clock pulses occurring on each, each pulse from each output occurring during the time between two successive clock pulses from the other output;

and wherein said "marker window" interval generated in the common unit and transmitted to the marker unit, has a timing and duration such that during the "marker window" interval the marker source of clock pulses always produces at least one pulse from its first output followed by one pulse from its second output.

8. In a communication switching system, the combination as claimed in claim 7, wherein said marker further includes sequence state circuits for producing a number of separate sequence states for controlling the sequence of operations thereof;

and wherein the sequence state circuits include means to control entering certain of the sequence states only during coincidence of a "marker window" interval and a pulse from said second output of the source of clock pulses, said certain sequence states being those relating to communication of data with the common unit, so that control commands from the marker unit to the common unit are only sent during the "marker window" interval;

the devices of the data register of the marker unit being loaded with data information for transmission to the common unit responsive to pulses from the first output of said source of clock pulses.

9. In a communication switching system, a combination as claimed in claim 8, wherein said common unit includes means to accept data into its data register only during said "common window" interval, and means to initiate commands to the marker unit only during said "common window."

10. In a communication switching system, the combination as claimed in claim 9, wherein the marker unit and the common unit each include means to generate a call for service command, a parity command and a go-ahead command as well as said "accept" signals, each said command signal being generated by a unit and initiated to the other unit only during its own "window interval."

11. In a communication switching system, the combination as claimed in claim 10, wherein there are a plurality of marker units and a plurality of common units, each of said data conductors being coupled in multiple to the direct-coupled inputs at the coincidence gates of corresponding devices of the data registers of each of the units having the receive mode;

and wherein the control conductors are also connected in multiple to all of the units having the receive mode to enable them to load the data from the data conductors into their devices during their "window" interval which occurs at the same time in all of them;

whereby all of the receive units are assured of adequate time for propagation of the data and priming of the input coincidence gates for their data registers.

12. In a communication switching system, the combination as claimed in claim 11, wherein each unit includes comparison check apparatus having a first set of inputs coupled from the outputs of the devices of its own data register, and another set of inputs coupled via conductors of said data bus from the outputs of the devices of the data register of the other unit, and an output on which a "valid comparison" signal condition appears when the signal condition on every lead of the first set of inputs is equal to the signal condition on the corresponding lead of the other set of inputs;

means, in the unit having the send mode, having an input coupled to the output of the comparison check apparatus, and operative responsive to said "valid comparison" signal condition to terminate said "accept" signal, the "accept" signal being continued if the "valid comparison" signal condition does not occur;

and means in the unit having the receive mode to reset the devices of its data register responsive to receiving said "accept" signal during periods outside of its "window" interval and wherein there are at least two of said operation cycles in which it is operative to couple pulses from its said source to the capacitance-coupled inputs of said coincidence gates, to thereby provide a repeated attempt to load the data from the data bus if said "valid comparison" signal condition is not obtained after the first attempt.

13. In a communication switching system, the combination as claimed in claim 6, wherein said marker further includes sequence state circuits for producing a number of separate sequence states for controlling the sequence of operations thereof;

and wherein the sequence state circuits include means to control entering certain of the sequence states only during coincidence of a "marker window" interval and a pulse from said source of clock pulses, said certain sequence states being those relating to communication of data with the common unit, so that control commands from the marker unit to the common unit are only initiated during the "marker window" interval.

14. In a communication switching system, a combination as claimed in claim 13, wherein said common unit includes means to accept data into its data register only during said "common window" interval;

and wherein the marker unit and the common unit each include means to generate a call for service command, a parity command and a go-ahead command as well as said "accept" signals, each said command signal being generated by a unit and initiated to the other unit only during its own "window interval."

References Cited

UNITED STATES PATENTS

| | | | |
|---|---|---|---|
| 3,001,017 | 9/1961 | Dirks | 340—146.1X |
| 3,252,138 | 5/1966 | Young | 340—146.1 |
| 3,334,331 | 8/1967 | Bartlett | 340—146.1X |

MALCOLM A. MORRISON, Primary Examiner

C. E. ATKINSON, Assistant Examiner

U.S. Cl. X.R.

178—50; 179—15